United States Patent [19]

Uchida

[11] 3,829,891

[45] Aug. 13, 1974

[54] SYSTEM FOR COUPLING MAGNETIC RECORDING AND REPRODUCING MACHINE WITH TELEVISION RECEIVER

[75] Inventor: Kasaku Uchida, Osaka, Japan

[73] Assignee: Matsushita Electric Industrial Company, Limited, Kadoma Osaka, Japan

[22] Filed: July 17, 1972

[21] Appl. No.: 272,225

[30] Foreign Application Priority Data

July 16, 1971 Japan .............................. 46-53449
July 16, 1971 Japan .............................. 46-53450

[52] U.S. Cl. .................... 360/33, 178/6, 179/100.11
[51] Int. Cl. ........................ H04n 5/78, G11b 31/00
[58] Field of Search .................. 178/6.6 R, 6.6 A, 6; 179/100.11

[56] References Cited

UNITED STATES PATENTS

| | | | |
|---|---|---|---|
| 3,270,131 | 8/1966 | Dinter | 178/6.6 A |
| 3,484,548 | 12/1969 | Kowal | 178/6 |
| 3,634,618 | 1/1972 | Ohe | 178/6.6 A |

FOREIGN PATENTS OR APPLICATIONS

| | | | |
|---|---|---|---|
| 1,008,236 | 10/1965 | Great Britain | 178/6.6 A |

*Primary Examiner*—Raymond F. Cardillo, Jr.

[57] ABSTRACT

The system includes a video modulator wherein a locally generated carrier wave of a certain frequency is modulated by a video signal from a video tape recording and reproducing machine, the modulated signal being delivered to a television receiver. A plurality of ganged switches have a first position to turn off the tuner of the television receiver and to simultaneously couple the modulated signal to the receiver's video if amplifier for reproduction on the screen. A second position turns the receiver's tuner on, disconnects the modulator from the receiver, and connects the machine to a second tuner, so that one can record video signals in one channel by the machine while observing picture information of another channel on the screen.

3 Claims, 4 Drawing Figures

SYSTEM FOR COUPLING MAGNETIC RECORDING AND REPRODUCING MACHINE WITH TELEVISION RECEIVER

This invention relates to the reproduction of video tape recordings on the screen of a television receiver. More particularly, it relates to improved systems for coupling a magnetic recording and reproducing machine of "cool chassis" type with a television receiver of "hot chassis" type by way of an IF modulator. One of the numerous advantages possessed by this invention is its ability to selectively display on the screen the video signal from the tuner of the television receiver and that from the recording and reproducing machine (which will be hereinafter referred to as VTR), by changing over those signals through use of a plurality of switches.

Generally, many of the oridinary television receivers are of "hot chassis" type whose chassis are connected directly to the AC power sources, while many VTRs are of "cool chassis" type wherein the chassis are electrically isolated from the AC power sources by insulating type power transformers provided therebetween. Thus, where it is desired to electrically couple the "hot chassis" television receiver with the "cool chassis" VTR, it is a conventional practice to render the receiver of "cool chassis" type by providing an insulating transformer in the AC power circuit. However, the insulating transformer as employed is rather expensive and of considerably large size to the detriment of compactness.

Another prior art method for coupling a television receiver of "hot chassis" type and a VTR of "cool chassis" type is by having the radio-frequency carrier wave of a certain unassigned channel of a television broadcast modulated by a video signal from the VTR, so that the modulated signal is then supplied at the radio-frequency input terminals of the receiver's tuner for visual display on the screen. However, this method is not satisfactory in that it is rather expensive and requires a troublesome, extra operation of switching the tuner's channel selector to the unassigned channel.

Therefore, it is an object of this invention to provide improved coupling systems for coupling a magnetic recording and reproducing machine with a television receiver, with a view to overcoming the above-said disadvantages.

Another object of this invention is to provide improved coupling systems for coupling a magnetic recording and reproducing machine of "cool chassis" type with a television receiver of "hot chassis" type, such that no electric shock is experienced when the output terminals of the machine are touched.

It is a further object of this invention to provide improved coupling systems of the above-described type that are capable of selectively coupling a video signal from the receiver's tuner and that from the recording and reproducing machine, to the receiver's picture tube so as to be selectively displayed visually on the screen.

It is still further object of this invention to provide improved coupling systems of the above-described type which are simple in construction and less expensive.

These and other objects will be readily apparent from the following description of embodiments of this invention when taken in conjunction with the accompanying drawings, in which.

Figure 1:
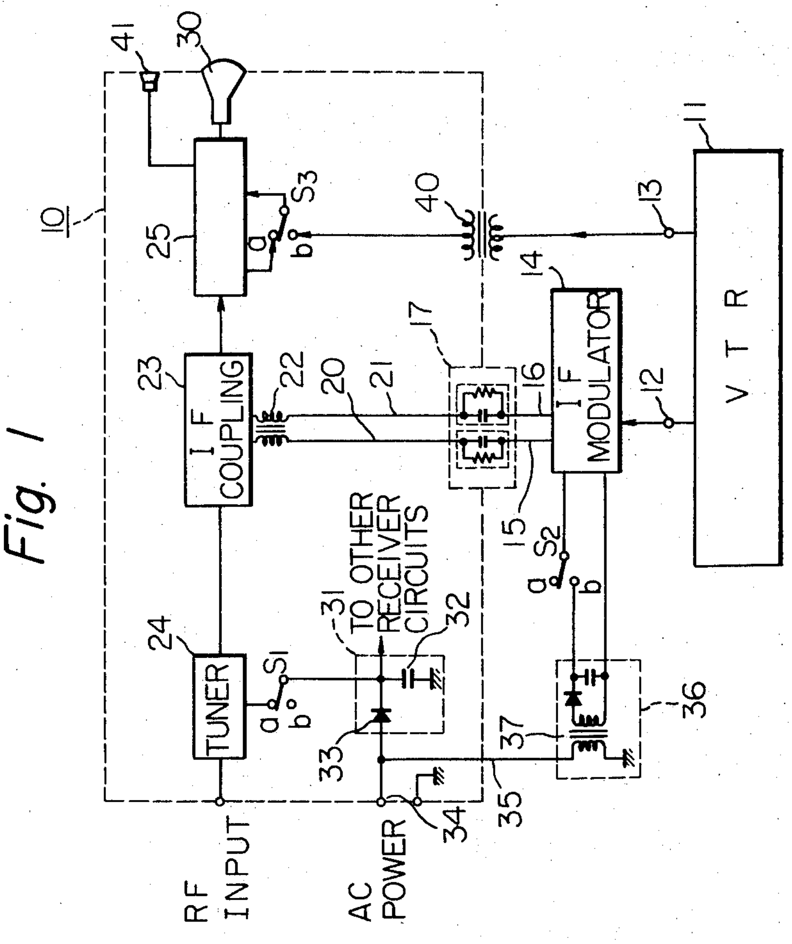
FIG. 1 is a block diagram showing one embodiment of this invention.

Referring now to FIG. 1, a television receiver adapted for visual reproduction of video tape recordings is shown as enclosed within a dash rectangle 10. The television receiver 10 is of "hot chassis" type whose power supplies are connected directly to an AC power source (not shown), while a VTR, shown below and designated at 11, is of "cool chassis" type in that an insulating type power transformer (not shown) is employed to provide electrical isolation between the power supplies and the AC power source.

As shown, the VTR 11 has a video output terminal 12 and an audio output terminal 13, the video output terminal 12 being connected to an IF modulator 14. The IF modulator 14 has a local oscillator (not shown) which is capable of generating a carrier wave of the same frequency as the intermediate-frequency of the television receiver 10. Thus, the function of the IF modulator 14 is to modulate the IF carrier wave by a video signal from the VTR 11.

Figure 2:
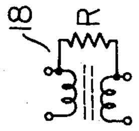
FIG. 2 is a modification of the insulating type coupling circuit shown in FIG. 1.

The modulated wave thus obtained is supplied through a pair of conductors 15, 16 to an insulating type coupling circuit 17. The coupling circuit 17 is of the type generally called "capristor" comprising two pairs of parallel-connected capacitor C and resistor R. The coupling circuit 17 functions to permit only the modulated wave to pass therethrough and also to provide electrical isolation between the "hot chassis" of the television receiver 10 and the "cool chassis" of the VTR 11 so as to prevent flow of harmful current or voltage components from the "hot chassis" into the "cool chassis." In this connection, it is to be noted that an IF transformer 18 of the conventional type as shown in FIG. 2 can also be employed as a substitute for the "capristor" 17. As will be appreciated, the leak resistors R shown in FIGS. 1 and 2 function to establish a leakage path for the electric charges stored between the "VTR's cool chassis" and the ground or power lines, and the value of the leak resistors R can be so selected as to perform this function in a satisfactory manner. Further, in so far as this function of establishing leakage paths is accomplished, the manner or location of connection of the leak resistors R is not restricted to those shown in FIGS. 1 and 2.

The modulated wave, after passing through the insulating coupling circuit 17, is supplied through another pair of conductors 20, 21 to a balanced-to-unbalanced transformer 22, generally called "balun," and then to an IF coupling circuit 23. The IF coupling circuit 23 is provided between the receiver's tuner 24 and the video IF amplifier, the video IF amplifier and its following circuits being generally designated at 25.

The "balun" 22 is a transformer of the type capable of effecting balanced-to-unbalanced transformation. In the case where the insulating coupling circuit 17 is comprised of what is called "capristor," it is sometimes experienced that due to the voltage difference present across the output terminals, that is, those on the receiver's side of the "capristor" and the chassis of the receiver 10, the picture on the screen tends to become unstable when the chassis of the VTR 11 is touched. To eliminate this, the "balun" 22 is introduced between the insulating coupling circuit 17 and the IF coupling circuit 23 so as to prevent transmission of unbalanced components of the modulated video signal to the receiver 10.

The "balun" transformer comprises a ferrite core having a pair of parallel apertures and wound up with a pair of insulated parallel lines. The "balun" transformer connected to the capristors serves to compensate for an unbalanced condition which is likely to occur due to balanced and unbalanced conditions of the television receiver and the video tape recording apparatus.

The coupling system according to this invention further includes a pair of mode-conversion switches $S_1$ and $S_2$ which are, as indicated by the broken lines 29, ganged together to selectively couple the video signal from the tuner 24 and that from the VTR 11, to the video IF amplifier, thus permitting selective display of those signals on the screen of the picture tube 30. These switches $S_1$ and $S_2$ have a first position, indicated at (a), corresponding to "TV reception" mode, and a second position, (b), corresponding to "VTR reproduction" mode.

The switch $S_1$ is of the commercially available type wherein two fixed contacts are selectively contacted by a movable arm. One of the fixed contacts corresponding to the "TV reception" mode is connected to the power input terminal of the tuner 24, and the movable arm is connected to a portion of the receiver's power supply enclosed within a small dash rectangle 31. The portion of the power supply 31 comprises a grounded capacitor 32 and a diode 33 connected thereto, the point between which is also connected to the power input portions of other receiver circuits (not shown). The electrode of diode 33 opposite to the capacitor 32 is connected to the output terminal 34 of an AC power source (not shown).

The output terminal 34 is also connected through a line 35 to additional power supply 36 for the IF modulator 14. The power supply 36 comprises an insulating power transformer 37 and is connected at its output to the power input of the IF modulator 14 through the switch $S_2$. Particularly, the movalbe arm of $S_2$ is connected to the IF modulator 14, and one of the two fixed contacts thereof corresponding to "VTR reproduction" mode is connected to the power supply 36. As will be understood, the provision of the insulating power transformer 37 renders the IF modulator 14 of "cool chassis" type, with the result that no electric shock is experienced when one touches the video output terminal 12 of the VTR 11.

In the first position shown in FIG. 1, the switch $S_1$ connects the tuner 24 to the receiver's power supply 31 to turn the tuner on and, simultaneously, the switch $S_2$ disconnects the IF modulator 14 from the power supply 36 to turn the modulator off. Thus, in this situation, it is understood that the video signal being supplied from the tuner 24 through the IF coupling circuit 23 and its following circuits 25, is displayed visually on the screen, while no video signal from the VTR 11 can reach the IF coupling circuit 23 because of the de-energization of the IF modulator 14. This means that the system is in the "TV reception" mode. On the other hand, the second position disconnects the tuner 24 from the power supply 31 turning the tuner off and, simultaneously, it connects the IF modulator 14 to the power supply 36 turning the modulator on. Thus, in the second position, the video signal from the VTR 11 is supplied through the IF modulator 14, insulating coupling circuit 17 and "balun" 22 to the IF coupling circuit 23 and eventually is displayed visually on the screen, which means that the system is in the "VTR reproduction" mode. There is no video signal supplied from the tuner 24 to the IF coupling circuit 23, since the tuner 24 remains de-energized.

Although, in this embodiment, both the switches $S_1$ and $S_2$ are employed to selectively turn the tuner 24 and the IF modulator 14 on or off, it is to be understood that this invention is not restricted thereto and that other methods of mode conversion that are capable of avoiding unwanted signals and interference waves without resort to the power on-off control are possible, of course.

While this invention has been described above with particular reference to video signals, the coupling system of the invention can also couple an audio signal from the VTR 11 to the television receiver 10. As shown, the audio output terminal 13 of the VTR 11 is connected to an insulating audio-frequency transformer 40, so that no electric shock is experienced when one touches the audio output terminal 13. The transformer 40 is then connected to one fixed contact of a switch $S_3$ of the type similar to $S_1$ and $S_2$. The switch $S_3$ is also ganged with $S_1$ and $S_2$ and, in the first position shown, disconnects the transformer 40 from the receiver 10. However, in the second position, the $S_3$ connects the transformer 40 to the receiver 10, so that the audio signal from the VTR 11 is reproduced by the speaker 41 concurrently with the visual reproduction of the video signal from the VTR 11. However, it will be appreciated that instead of coupling by the use of an insulating audio-frequency transformer it is possible to supply the audio signal also to the IF modulator 14 to modulate the audio IF carrier wave, so that the resulting signal may be supplied to the receiver 10 along with the video signal. In this case, the switch $S_3$ is omitted.

Figure 3:
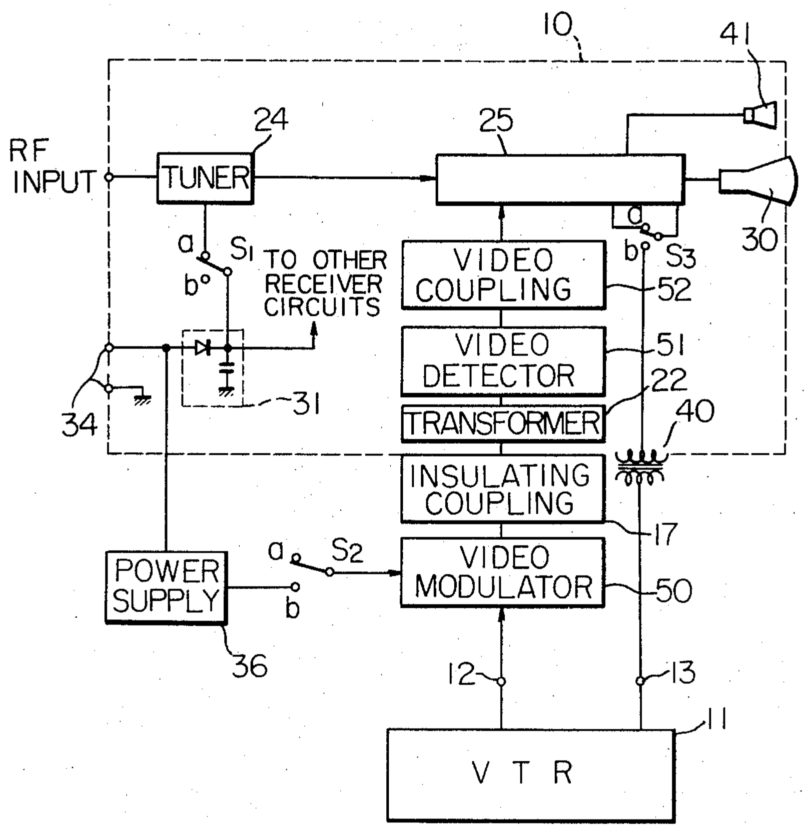
FIGS. 3 and 4 are block diagrams showing other embodiments of this invention.

Referring to FIG. 3, a block diagram of a second embodiment of this invention is shown. In this embodiment, a video modulator 50 is provided in lieu of the IF modulator 14 shown in FIG. 1, which video modulator functions to have a locally generated carrier wave of a certain frequency lying between 20 and 200 mhz modulated by a video signal from the VTR 11. The modulated wave thus obtained is caused to pass through the same insulating type coupling circuit and "balun" as those shown in FIG. 1 and enters a video detector 51 of the conventional type. The video detector's output is supplied to a video coupling circuit 52, the function of which is to couple a video signal from the VTR to the television receiver. In this connection, it will be appreciated that the video coupling circuit 52 is provided in place of the IF coupling circuit 23 (FIG. 1) connected between the tuner 24 and the video IF amplifier. Although not specifically shown, the video coupling circuit 52 is connected to the video IF amplifier. With this embodiment, the video signal from the tuner 24 and that from the VTR 11 are selectively displayed visually on the screen as desired by the change-over of the mode-conversion switches $S_1$ and $S_2$.

Figure 4:
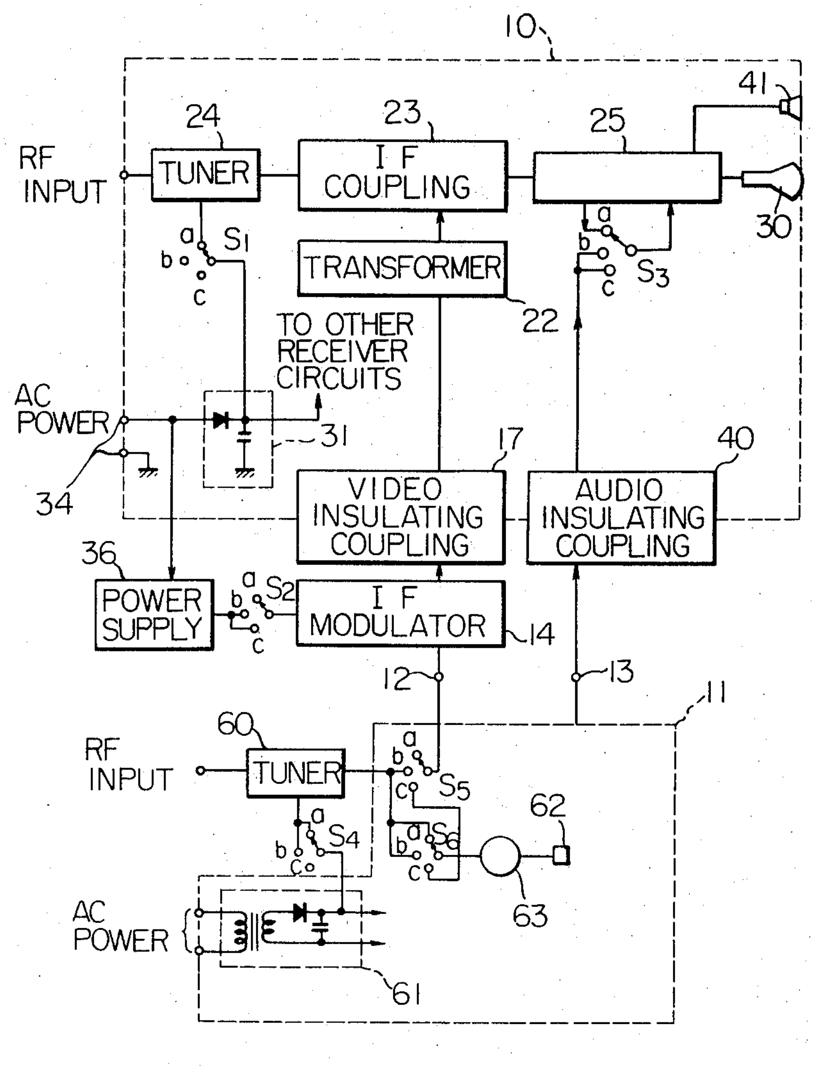

Referring to FIG. 4, a third embodiment of this invention is illustrated in block form. As shown, a second tuner 60 is provided through which a video signal to be recorded by the VTR 11 is obtained. Further, three more mode-conversion switches $S_4$, $S_5$ and $S_6$ are provided for ganged operation with switches $S_1$, $S_2$ and $S_3$. The switch $S_4$ is connected between the VTR's power supply 61 and the power input of the second tuner 60 to the power on-off control of the tuner 60. In this embodiment, the six mode-conversion switches $S_1$ through $S_6$ have three positions, that is, a first position, (a), corresponding to "TV reception" mode, a second position, (b), corresponding to "VTR monitor" mode, and a third position, (c), to "VTR reproduction" mode.

Designated at 62 is a start switch for the VTR 11, which has various modes, for example, of "record," "playback," "rewind" and "fast forward." The start switch 62 is connected to a recording and reproducing head assembly 63 which in turn is connected to the movable arm of $S_6$. The two fixed contacts of $S_6$ corresponding respectively to positions (a) and (b) are connected together to the output of the tuner 60, and the remaining fixed contact of $S_6$ is connected to the fixed contact of $S_5$ corresponding to position (c). The fixed contact of $S_5$ corresponding to position (b) is also connected to the output of the tuner 60 and the movable arm thereof is connected to the input of the IF modulator 14. The switch $S_4$, in the positions (a) and (b) only, connects the tuner 60 to the power supply 61.

With this embodiment, if one desires to enjoy the two television programs which are being broadcast at the same time, he can record a first one of the two by the VTR while watching a second one on the screen, by setting the mode-conversion switches to position (a). Further, if, during this mode, it is desired to monitor the picture quality of the second program being recorded, it will suffice to set the switches to position (b). The third position, that is, position (c) disconnects the first tuner 24 and the second tuner 60 from their respective power supplies 36 and 61, and connects the VTR to the receiver, so that the recorded video and audio signals are reproduced by the receiver.

The operation of recording a television program by the VTR is as follows:

The mode-conversion switches are set to position (b). In this situation, the video signal of a second program obtained through the second tuner 60 is supplied through $S_5$ to the receiver and displayed on the screen. Observing the picture on the screen will facilitate adjustment of the second tuner 60 or the like to provide for best picture quality. Then, the start switch 62 of VTR is set to "recording," resulting in the commencement of the recording operation. Thereafter, one will switch to position (a) to enjoy the first program on the screen, while the recording operation continues. If necessary, the picture quality of the second program being recorded can be monitored by switching back to (b).

After termination of the recording operation, one can reproduce the video tape recordings on the receiver's screen by switching to "playback" while at the same time setting the mode-conversion switches at (c).

As have been described above, this invention provides improved coupling systems for coupling a VTR of "cool chassis" type with a television receiver of "hot chassis" type such that no electric shock is experienced when the VTR's output terminals are touched. Further, this invention provideds improved coupling systems of the above-described type wherein a video signal from the VTR is introduced into the receiver at a stage following the tuner thereof and a plurality of mode-conversion switches selectively couple the video signal from the tuner and that from the VTR, to the picture tube of the receiver so as to be selectively displayed on the screen.

What is claimed is:

1. In a system wherein a television receiver, having a tuner connected through an IF coupling circuit and a video IF amplifier to a picture tube, is adapted to visually reproduce a video signal from a magnetic recording and reproducing apparatus, the improvement for coupling the receiver with the apparatus, said improvement comprising:

modulator means responsive to the video signal for generating a modulated signal depended thereupon; and switch means for selectively coupling a video signal from the tuner and the modulated signal from the modulator means with the picture tube so as to be selectively displayed on the screen of the tube, wherein the television receiver is of "hot chassis" type and the magnetic recording and reproducing apparatus is of "cool chassis" type, the modulated output of the modulator means being insulating-coupled to the receiver, and wherein the modulator means comprises;

an IF modulator for modulating a locally generated carrier wave of the same frequency as the intermediate-frequency of the television receiver, by the video signal from the recording and reproducing apparatus, and further comprising an insulating coupling means connected at one side to the output of the IF modulator; and a balanced-to-unbalanced transformer means connected between the insulating coupling means and said IF coupling circuit.

2. A circuit arrangement for coupling a television receiver, having a tuner connected through an IF coupling circuit to circuit means which in turn are connected to a picture tube and a speaker, and a video tape recording apparatus including means for modulating a carrier of a given frequency in accordance with the video signal thereof, the improvement wherein said circuit arrangement comprises a pair of leads connected between said means and said IF coupling circuit for transmitting said modulated video signal, a pair of capacitors respectively interposed in each of said leads for passing the high frequency component of said modulated signal, a pair of resistors each being connected across each of said capacitors to provide a leakage path for charges accumulated in said capacitors and other means, interposed between said capacitors and said IF coupling circuit, for compensating for unbalanced condition appearing on said leads due to balanced and unbalanced conditions of said receiver recording apparatus.

3. A circuit arrangement as in claim 2, wherein said other means is a "balun" transformer having a ferrite core with a pair of parallel apertures and wound with a pair of insulated parallel lines, each of said parallel lines being respectively interposed in each of said leads.

* * * * *